UNITED STATES PATENT OFFICE.

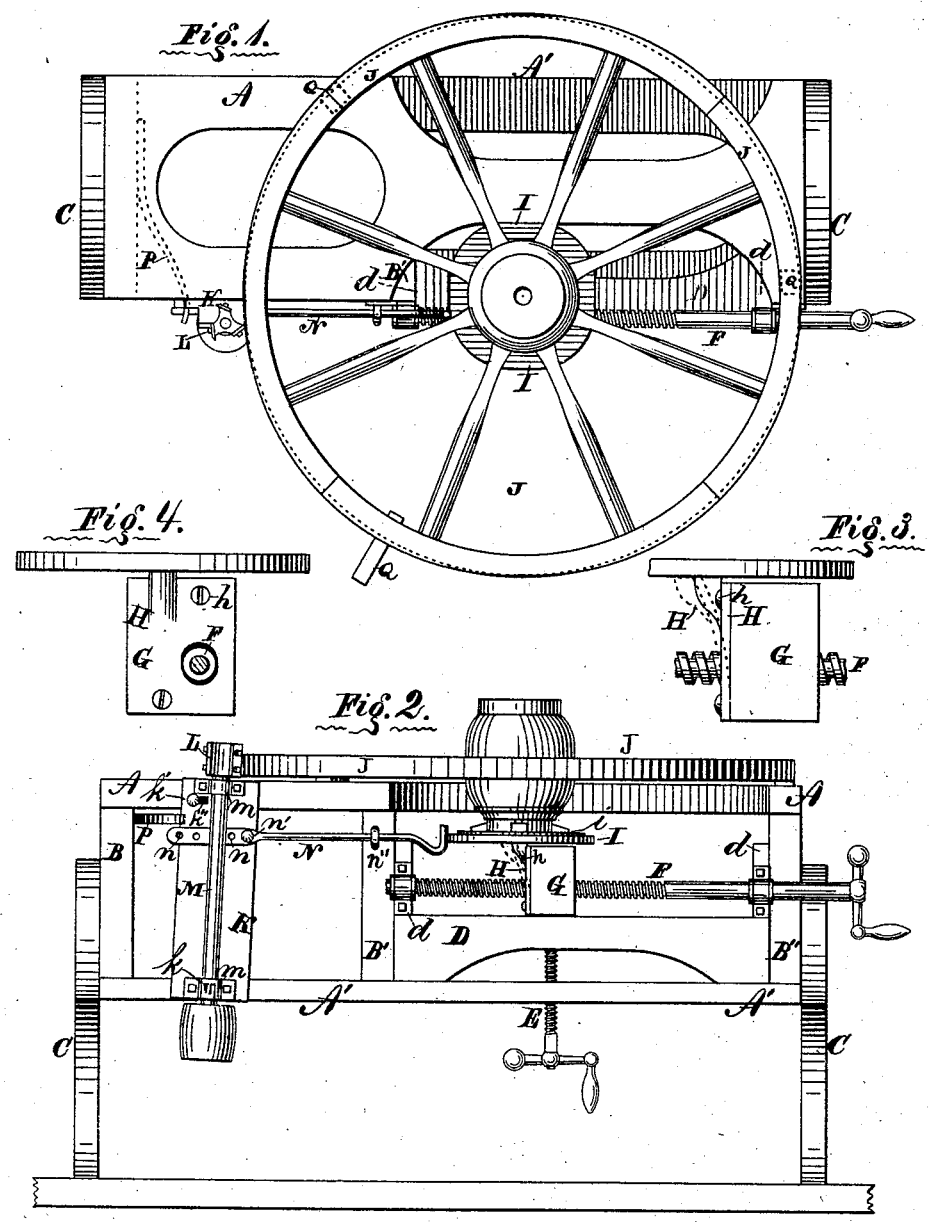

MOSES C. BUFFINGTON, OF BURLINGTON, IOWA, ASSIGNOR OF ONE-HALF HIS RIGHT TO JAMES M. FORNEY, OF SAME PLACE.

IMPROVEMENT IN WHEELWRIGHT MACHINES.

Specification forming part of Letters Patent No. 155,220, dated September 22, 1874; application filed June 9, 1874.

CASE D.

*To all whom it may concern:*

Be it known that I, MOSES C. BUFFINGTON, of Burlington, in the county of Des Moines and State of Iowa, have invented certain new and useful Improvements in Wheelwrights' Machines, of which the following is a specification:

The present invention relates to improvements in machines for dressing the periphery of the rims of vehicle-wheels; and the invention consists, first, in hinging or pivoting the shaft which carries the rotary cutter to the main frame in such manner that a projecting bar therefrom may impinge upon the edge of a cam-shaped disk, which rotates with the wheel for the purpose of reciprocating the cutter toward and from the wheel, to produce what is generally known in the trade as swelled joints; second, in securing the wheel and cam-shaped disk to the carrying-block in such manner that when the oscillating movement of the rotary cutter-shaft is prevented, by devices provided for the purpose, the wheel and cam may have a reciprocating movement toward and from the cutter through the instrumentality of the aforesaid bar impinging upon the cam, as hereinbefore narrated, and all as hereinafter more fully described.

To enable those skilled in the art to make and use my invention, I will now proceed to describe the manner in which the same is or may be carried into effect by reference to the accompanying drawing, in which—

Figure 1 is a top view of a machine embodying my invention. Fig. 2 is a side elevation of the same. Fig. 3 is a front elevation of the block G and adjacent parts; and Fig. 4 is a side elevation of the same seen from the left-hand side.

Referring to the accompanying drawings by letters, A A' represent the longitudinal and B B' B'' the transverse bars of a main frame for carrying the working devices, and are themselves supported on legs C C. D is a bar with blocks $d\,d$ upon its ends, which slide in suitable ways or guides on the framing-bars B' B''. E is a screw passing up through a threaded hole in the bar A'. F is a feeding-screw provided with suitable journal-bearings in the blocks $d\,d$, and carries a block, G, which rests upon the upper surface of the bar D. H is a spring-bar attached at its lower end to one side of the block G, so that its normal position will be, as shown by dotted lines at Figs. 2 and 3; and it may be held close to the side of said block G, as shown by the full lines at the same figures, by means of a set-screw, $h$. I is a cam-shaped disk secured to the upper end of the spring-bar H, and is provided on its upper side with a chuck, $i$, or any other device by which a wheel, J, may be securely and centrally mounted upon the disk I. K is a plate placed transversely on the bars A A', pivoted at $k$ on the bar A', so that it may be oscillated in a vertical plane parallel with the axis of the feed-screw F, and the position of its oscillating end may be fixed by a set-screw, $k'$, which passes through a slot, $k''$, in the plate K, and into the side frame A. L is the rotary cutter carried on a shaft, M, which has suitable bearings $m\,m$ on the plate K. N is a tappet, one end of which is pierced with a series of holes, $n$, by which its extension may be adjusted from the bar K, and fixed by the set-screw $n'$, its other end stayed or steadied by passing through an eye, $n''$, projecting from the bar B'. P is a spring arranged so as to exert a continual pressure against the rear side of the free end of the plate K.

The operation of my invention is as follows: The wheel J, being secured, as hereinbefore stated, upon the cam-disk I, its relative height to the cutter L may be regulated by the adjusting-screw E, and its proper relative distance thereto be regulated by the feed-screw F. The length of the tappet N may now be adjusted by the set-screw $n'$, so that its end resting against the cam I will give a vibratory motion to the shaft M, aided by the spring P, the set-screw $k'$ being loosened for the purpose of admitting of the same, or, if desired, the set-screw $k'$ may be tightened to fix the position of the shaft M, and the set-screw $h$ removed, when it will be evident that the wheel itself may be moved back and forth to the rotary cutter L, the spring-bar H pressing it toward the cutter and the tappet N and cam I in the opposite direction. The cam I having as many faces as there are fellies in the wheel J, and the angles between the faces of the cam being arranged relatively to the joints between the fellies, in the same radial planes as said fellies, it will be evident that the periphery of the wheel will be swelled or enlarged, as shown by full lines at Fig. 1, the dotted lines showing a true circle. The wheel may be steadied by resting on the frame A and by any suitable blocks Q.

I claim—

1. The oscillating shaft M and cutter L, tappet N, and cam I, arranged to operate upon the wheel J, substantially as described, and for the purpose specified.

2. The screws E and F, block G, spring H, cam I, and tappet N, operating in combination with the rotary cutter L, substantially as and for the purpose specified.

MOSES C. BUFFINGTON.

Witnesses:
JAMES M. FORNEY,
W. W. BALDWIN.